US012768670B2

(12) United States Patent
Kim et al.

(10) Patent No.: US 12,768,670 B2
(45) Date of Patent: Oct. 20, 2026

(54) APPARATUS FOR GUIDING FLIGHT ROUTE OF AIR MOBILITY AND METHOD THEREOF

(71) Applicants: Hyundai Motor Company, Seoul (KR); Kia Corporation, Seoul (KR)

(72) Inventors: Hyun Jin Kim, Hwaseong-si (KR); Dong Kyu Kim, Hwaseong-si (KR); Dong Hyun Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 83 days.

(21) Appl. No.: 18/911,642

(22) Filed: Oct. 10, 2024

(65) Prior Publication Data

US 2025/0130070 A1 Apr. 24, 2025

(30) Foreign Application Priority Data

Oct. 23, 2023 (KR) ........................ 10-2023-0142290

(51) Int. Cl.
*G01C 23/00* (2006.01)
*G01C 21/20* (2006.01)

(52) U.S. Cl.
CPC ........... *G01C 23/005* (2013.01); *G01C 21/20* (2013.01)

(58) Field of Classification Search
CPC .... G01C 23/005; G01C 21/005; G01C 21/20; G01C 21/34; G08G 5/26; G08G 5/32; G08G 5/34; G08G 5/53; G08G 5/76; B64D 47/00
See application file for complete search history.

(56) References Cited

U.S. PATENT DOCUMENTS

| | | | | |
|---|---|---|---|---|
| 7,877,197 | B2 | 1/2011 | Lewis et al. | |
| 9,329,045 | B2 * | 5/2016 | Coulmeau | G05D 1/106 |
| 9,607,521 | B2 * | 3/2017 | Coulmeau | G01C 21/20 |
| 11,315,432 | B2 | 4/2022 | Schmidt | |
| 11,348,473 | B2 | 5/2022 | Hunter | |
| 11,667,381 | B2 * | 6/2023 | Shimezawa | H04B 17/382 701/3 |

(Continued)

FOREIGN PATENT DOCUMENTS

| | | |
|---|---|---|
| JP | 2008287715 A | 11/2008 |
| JP | 2015527644 A | 9/2015 |

(Continued)

*Primary Examiner* — Mussa A Shaawat
(74) *Attorney, Agent, or Firm* — Slater Matsil, LLP

(57) ABSTRACT

An embodiment apparatus includes a communication device for communicating with first and second air mobilities, one or more processors for guiding a flight route of the second air mobility based on flight environment information obtained by the first air mobility, and a non-transitory storage device storing a program to be executed by the one or more processors, the program including instructions to determine a cost between an arbitrary source node set in an airspace and a neighboring node adjacent to the source node based on the flight environment information, determine departure and arrival nodes among the plurality of nodes based on flight information of the second air mobility scheduled to fly in the airspace for which the cost is calculated, and determine the flight route of the second air mobility to minimize a sum of the cost between transit nodes connecting the departure and arrival nodes.

18 Claims, 11 Drawing Sheets

(56) References Cited

U.S. PATENT DOCUMENTS

| | | | | |
|---|---|---|---|---|
| 11,721,221 | B2 * | 8/2023 | Mustafic | H04W 48/08 701/122 |
| 11,862,027 | B2 | 1/2024 | Furumoto | |
| 11,869,367 | B2 * | 1/2024 | Kim | G08G 5/59 |
| 11,923,957 | B2 * | 3/2024 | De Rosa | G08G 5/32 |
| 12,007,770 | B2 * | 6/2024 | Heo | G05D 1/102 |
| 2008/0288164 | A1 | 11/2008 | Lewis et al. | |
| 2013/0073327 | A1 * | 3/2013 | Edelberg | G06Q 10/0631 705/7.13 |
| 2016/0003620 | A1 | 1/2016 | Kapoor et al. | |
| 2017/0229026 | A1 * | 8/2017 | Kneuper | G08G 5/21 |
| 2018/0061251 | A1 * | 3/2018 | Venkatraman | G01C 21/20 |
| 2019/0056233 | A1 * | 2/2019 | Liu | G01C 21/3484 |
| 2019/0340934 | A1 * | 11/2019 | Villa | G08G 5/22 |
| 2020/0020237 | A1 | 1/2020 | Grimald et al. | |
| 2020/0043351 | A1 | 2/2020 | Hunter | |
| 2020/0278695 | A1 | 9/2020 | Tuukkanen et al. | |
| 2020/0349852 | A1 * | 11/2020 | DiCosola | G08G 5/55 |
| 2021/0012666 | A1 | 1/2021 | Schmidt | |
| 2021/0063172 | A1 * | 3/2021 | Jung | G08G 1/096844 |
| 2021/0082291 | A1 * | 3/2021 | Villa | G08G 5/56 |
| 2021/0110444 | A1 * | 4/2021 | Schwartz | G08G 5/53 |
| 2021/0319705 | A1 | 10/2021 | Furumoto | |
| 2022/0024582 | A1 | 1/2022 | Nakazawa et al. | |
| 2022/0058970 | A1 | 2/2022 | Haskins et al. | |
| 2022/0262262 | A1 * | 8/2022 | Driscoll | G08G 5/55 |
| 2022/0326710 | A1 * | 10/2022 | Heo | B64C 13/12 |
| 2023/0343226 | A1 * | 10/2023 | Bieringer | G08G 5/20 |

FOREIGN PATENT DOCUMENTS

| | | | |
|---|---|---|---|
| JP | 2020009281 | A | 1/2020 |
| JP | 6890749 | B1 | 6/2021 |
| JP | 2021532524 | A | 11/2021 |
| KR | 20170048875 | A | 5/2017 |
| KR | 20210007830 | A | 1/2021 |
| KR | 20220137608 | A | 10/2022 |
| WO | 2021033256 | A1 | 2/2021 |

* cited by examiner

APPARATUS FOR GUIDING FLIGHT ROUTE OF AIR MOBILITY AND METHOD THEREOF

CROSS-REFERENCE TO RELATED APPLICATIONS

This application claims the benefit of Korean Patent Application No. 10-2023-0142290, filed on Oct. 23, 2023, which application is hereby incorporated herein by reference.

TECHNICAL FIELD

The present disclosure relates to an apparatus for guiding a flight route of an air mobility and a method thereof.

BACKGROUND

An air mobility has been actively researched for future transportation and transportation systems. Because the air mobility generally flies along a specified route in an airspace, real-time changes in the atmospheric and communication conditions of the flight route must be taken into consideration. However, according to the related art, there is no way to set the flight route of an air mobility to apply real-time changes in standby and communication states, and as a result, there are cases where factors that adversely affect the flight of the air mobility occur. Therefore, there is a need to provide a method capable of proactively and flexibly providing a flight route for an air mobility in response to the weather environment of the airspace in real time.

In addition, because it is preferable for an air mobility to arrive at the destination quickly, it is necessary to set the flight route such that the flight time is minimal.

SUMMARY

The present disclosure relates to an apparatus for guiding a flight route of an air mobility and a method thereof. Particular embodiments relate to a technology for guiding an optimal flight route in real time.

Embodiments of the present disclosure can solve problems occurring in the prior art while advantages achieved by the prior art are maintained intact.

An embodiment of the present disclosure provides an apparatus and method for guiding a flight route of an air mobility that may flexibly respond to the weather environment of an airspace.

In addition, another embodiment of the present disclosure provides an apparatus and method for guiding a flight route of an air mobility that may more efficiently determine the flight route of the air mobility by applying changes in the flight environment over time.

In addition, still another embodiment of the present disclosure provides an apparatus and method for guiding a flight route of an air mobility that may set the flight route to further reduce flight time.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an apparatus for guiding a flight route of an air mobility includes a communication device that communicates with a first air mobility and a second air mobility and a processor that guides a flight route of the second air mobility based on flight environment information obtained by the first air mobility. The processor may calculate a cost between an arbitrary source node among a plurality of nodes set in an airspace and a neighboring node adjacent to the source node based on the flight environment information provided from the first air mobility through the communication device, determine a departure node and an arrival node among the plurality of nodes based on flight information of the second air mobility scheduled to fly in the airspace for which the cost is calculated, and determine the flight route of the second air mobility to minimize a sum of the cost between transit nodes connecting the departure node and the arrival node.

According to an embodiment, the processor may extract wind direction information and wind speed information between the source node and the neighboring node from the flight environment information, calculate an expected flight time between the source node and the neighboring node by reflecting the wind direction information and the wind speed information, and determine the cost to be proportional to the expected flight time.

According to an embodiment, the processor may obtain a distance vector from the source node to the neighboring node, obtain a ground speed vector when assuming a situation where the second air mobility flies from the source node to the neighboring node, and calculate the cost to be proportional to a size of the distance vector and inversely proportional to a size of the ground speed vector.

According to an embodiment, the processor may obtain a weight that decreases with time from a reference timing at which the first air mobility obtains the flight environment information, obtain a wind speed vector to which the weight is applied, and obtain the ground speed vector by adding the weighted wind speed vector and an estimated flight speed vector of the second air mobility.

According to an embodiment, the processor may determine the weight to be 0 (zero) after a threshold time elapses from the reference timing.

According to an embodiment, the processor may update the cost based on the flight information of the second air mobility.

According to an embodiment, the processor may extract performance information of the second air mobility from the flight information, determine whether an airspeed of the second air mobility is able to be set such that the ground speed vector according to a flight of the second air mobility is in a same direction as the distance vector based on the performance information of the second air mobility, and set the cost between the source node and the neighboring node to infinite when the ground speed vector is unable to be adjusted in the same direction as the distance vector.

According to an embodiment, the processor may calculate a dilution of precision (DOP) for an area between the source node and the neighboring node, determine whether an auxiliary navigation device of the second air mobility is available in the flight information based on the DOP to which the weight is applied being greater than a threshold value, and set the cost between the source node and the neighboring node to be infinite based on the auxiliary navigation device of the second air mobility being unavailable.

According to an embodiment, the processor may reset the reference timing to 0 after the cost is updated.

According to an embodiment, the processor may monitor whether the cost is updated after determining the flight route of the second air mobility and reset the flight route based on the cost being updated.

According to another embodiment of the present disclosure, a method of guiding a flight route of an air mobility includes calculating a cost between an arbitrary source node among a plurality of nodes set in an airspace and a neighboring node adjacent to the source node based on flight environment information obtained by a first air mobility, determining a departure node and an arrival node among the plurality of nodes based on flight information of a second air mobility scheduled to fly in the airspace for which the cost is calculated, and determining a flight route of the second air mobility to minimize a sum of the cost between transit nodes connecting the departure node and the arrival node.

According to an embodiment, the calculating of the cost may include extracting wind direction information and wind speed information between the source node and the neighboring node from the flight environment information, calculating an expected flight time between the source node and the neighboring node by reflecting the wind direction information and the wind speed information, and determining the cost to be proportional to the expected flight time.

According to an embodiment, the calculating of the cost may include obtaining a distance vector from the source node to the neighboring node, obtaining a ground speed vector when assuming a situation where the second air mobility flies from the source node to the neighboring node, and calculating the cost to be proportional to a size of the distance vector and inversely proportional to a size of the ground speed vector.

According to an embodiment, the obtaining of the ground speed vector may include obtaining a weight that decreases with time from a reference timing at which the first air mobility obtains the flight environment information, obtaining a wind speed vector to which the weight is applied, and adding the weighted wind speed vector and an estimated flight speed vector of the second air mobility.

According to an embodiment, the obtaining of the weight may further include determining the weight to be 0 (zero) after a threshold time elapses from the reference timing.

According to an embodiment, the calculating of the cost may further include updating the cost based on the flight information of the second air mobility.

According to an embodiment, the calculating of the cost may further include extracting performance information of the second air mobility from the flight information, determining whether an airspeed of the second air mobility is able to be set such that the ground speed vector according to a flight of the second air mobility is in a same direction as the distance vector based on the performance information of the second air mobility, and setting the cost between the source node and the neighboring node to infinite when the ground speed vector is unable to be adjusted in the same direction as the distance vector.

According to an embodiment, the calculating of the cost may further include calculating a dilution of precision (DOP) for an area between the source node and the neighboring node, determining whether an auxiliary navigation device of the second air mobility is available in the flight information based on the DOP to which the weight is applied being greater than a threshold value, and setting the cost between the source node and the neighboring node to be infinite based on the auxiliary navigation device of the second air mobility being unavailable.

According to an embodiment, the calculating of the cost may further include resetting the reference timing to 0 after the cost is updated.

According to an embodiment, the method may further include monitoring whether the cost is updated after determining a flight route of the second air mobility and resetting the flight route based on the cost being updated.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
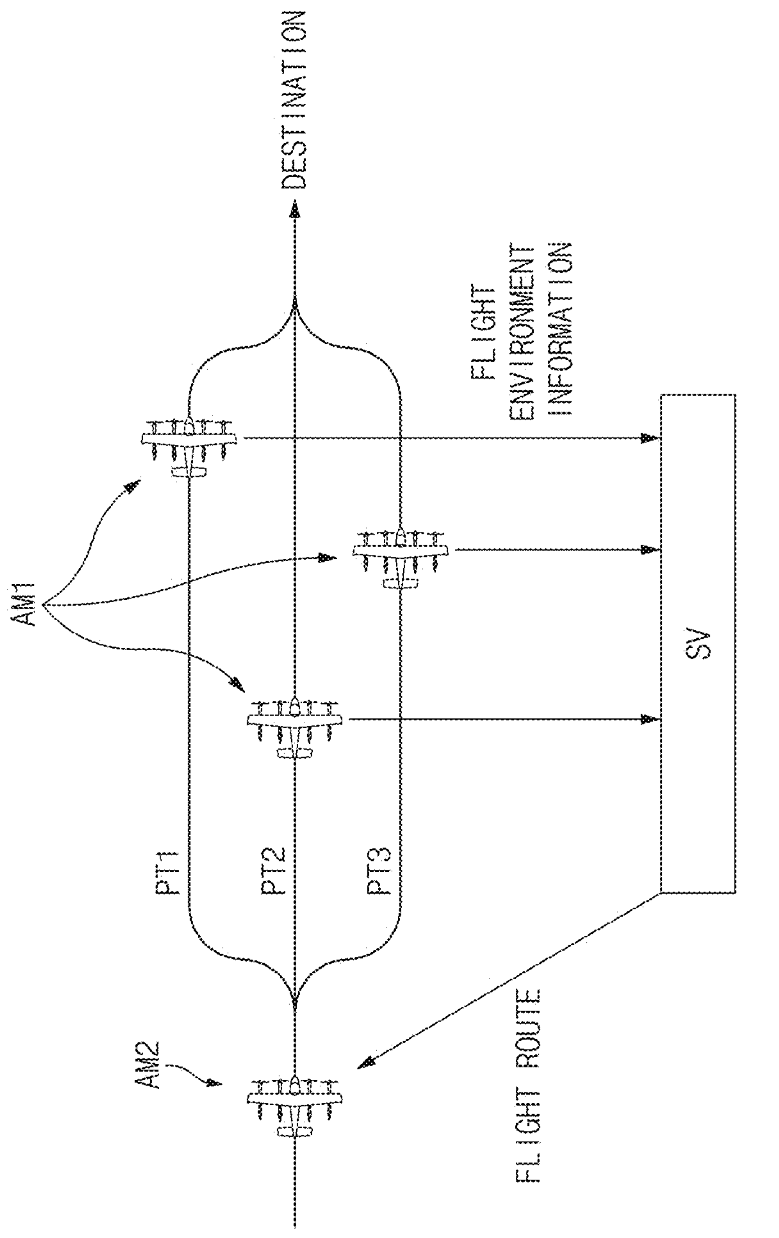
FIG. 1 is a diagram illustrating a method of guiding a flight route of an air mobility according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in detail with reference to FIGS. 1 to 11.

Figure 2:
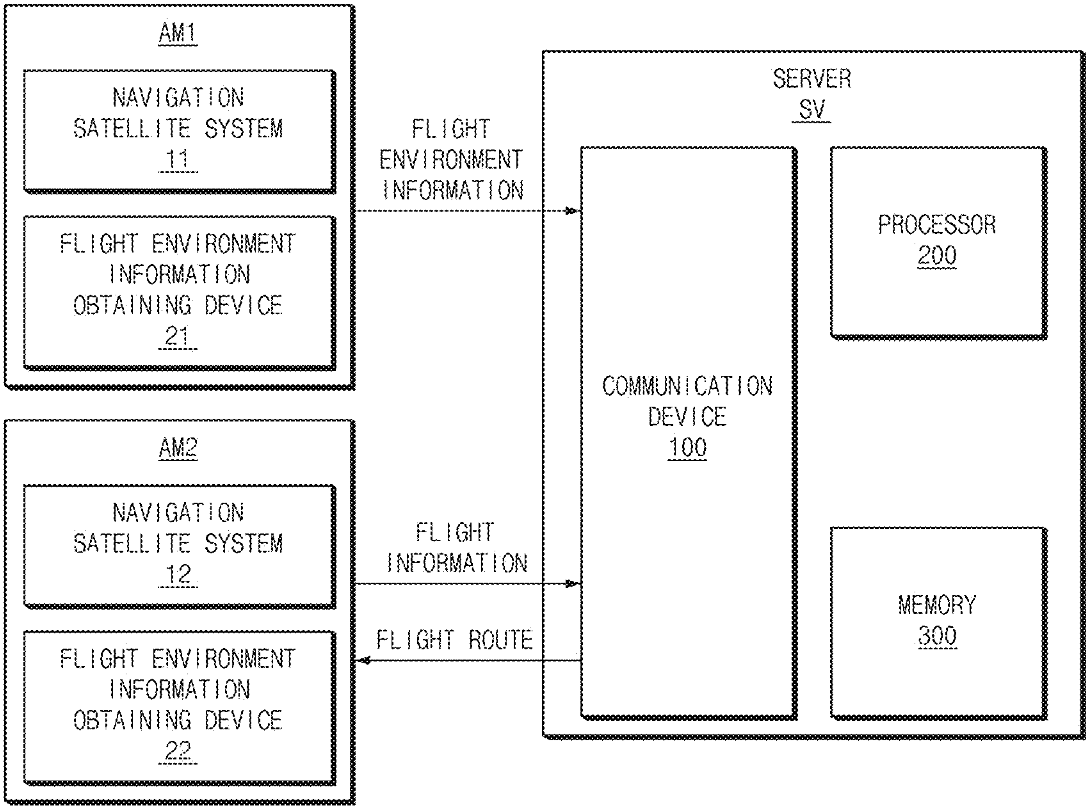
FIG. 2 is a block diagram illustrating the configuration of a route guidance apparatus according to an embodiment of the present disclosure.

FIG. 1 is a diagram illustrating a method of guiding a flight route of an air mobility according to an embodiment of the present disclosure. FIG. 2 is a block diagram illustrating the configuration of a route guidance apparatus according to an embodiment of the present disclosure.

An apparatus for guiding a flight route of an air mobility according to an embodiment of the present disclosure may be mounted on a server SV located outside the air mobility. Hereinafter, in an embodiment of the present disclosure, the apparatus for guiding a flight route of an air mobility will be referred to as the server SV.

In addition, an air mobility to which embodiments of the present disclosure are applicable may refer to an aircraft capable of flying in a flight space. The air mobility may refer to a flight unit such as a helicopter, a drone, an airplane, and the like, and may include a vehicle that moves on the ground using wheels and flies with the wheels separated from the ground. In addition, the air mobility may include an unmanned aircraft and a manned aircraft. The manned aircraft may include an aircraft on which a passenger boards while flying autonomously, in addition to aircraft on which a pilot controls the air mobility.

With reference to FIGS. 1 and 2, a method of guiding a flight route of an air mobility using an apparatus for guiding a flight route of an air mobility will be described below.

First an air mobility AM1 may refer to an aircraft that flies prior to a second air mobility AM2, which will be described later, and may be referred to as a pathfinder.

The first air mobility AM1 may obtain location information based on a global navigation satellite system (GNSS) 11 and fly using the obtained location information.

The first air mobility AM1 may obtain flight environment information through a flight environment information obtaining device 21 while flying a certain flight route in an airspace. An airspace may refer to a flight space with a certain range of heights to ensure safe air mobility activities. Flight environment information may include dilution of precision (DOP), wind direction information, and wind speed information.

The first air mobility AM1 may match flight environment information to location information and transmit the flight environment information matched to the location information to the server SV.

The second air mobility AM2 may refer to an aircraft that flies at least a part of the route flown by a plurality of pathfinders and may be referred to as a follower. In addition, the second air mobility AM2 may be a pathfinder for other followers, and to this end, flight environment information may be obtained during flight.

The second air mobility AM2 may obtain location information based on a global navigation satellite system 12 and fly using the obtained location information.

The second air mobility AM2 may obtain the flight environment information through a flight environment information obtaining device 22 while flying a certain flight route in an airspace.

The server SV may calculate the cost for the flight space based on the flight environment information obtained by the first air mobility AM1 and may calculate the flight route of the second air mobility AM2 based on the calculated cost. For example, the server SV may receive flight environment information on first to third flight routes PT1 to PT3 from the first air mobility AM1 that moves along the first flight route PT1, the second flight route PT2, and the third flight route PT3. The server SV may calculate the cost for each of the first to third flight routes PT1 to PT3 based on the flight environment information. In addition, the server SV may guide the flight to a route that minimizes the cost of the second air mobility AM2.

According to an embodiment, the cost may include information on the time taken to travel a specific route. Accordingly, the server SV may guide the flight route such that the flight time of the second air mobility AM2 is minimized.

According to another embodiment, the cost may be calculated to be proportional to fuel consumption. To this end, the server SV may receive information about an amount of fuel consumed in the process of flying a specific route from the first air mobility AM1.

To this end, the server SV may include a communication device 100, a processor 200, and a memory 300.

The communication device 100 may communicate with the first air mobility AM1 and the second air mobility AM2. The communication device 100 may perform communication based on global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTEA), and the like. The communication device 100 may use any other schemes for long-distance communication.

The communication device 100 may receive flight environment information from the first air mobility AM1 and flight information from the second air mobility AM2. In addition, the communication device 100 may transmit the flight route generated by the processor 200 to the second air mobility AM2.

The processor 200 may calculate the cost between an arbitrary source node and a neighboring node among a plurality of nodes set in the airspace based on the flight environment information obtained by the first air mobility AM1.

In addition, the processor 200 may determine a departure node and an arrival node among the plurality of nodes based on the flight information of the second air mobility AM2 scheduled to fly in the airspace for which the cost is calculated.

In addition, the processor 200 may determine the flight route of the second air mobility such that the sum of costs between transit nodes connecting the departure node and the arrival node is minimized.

The specific operations of the server SV using the processor 200 will be described later.

In addition, the processor 200 may use an artificial intelligence (AI) processor in the process of determining a flight route. The AI processor may learn a neural network by using a pre-stored program. A neural network for detecting a target vehicle and a dangerous vehicle may be designed to simulate the structure of the human brain on a computer, and it may include a plurality of network nodes with weights that simulate neurons of a human neural network. In a plurality of network nodes, a neuron that transmits and receives a signal through a synapse may transmit and receive data according to a connection relationship to simulate the synaptic activity of a neuron. The neural network may include a deep learning model developed from a neural network model. In a deep learning model, a plurality of network nodes may exchange data according to a convolutional connection relationship while being located in different layers. For example, a neural network model may include various deep learning schemes such as a deep neural network (DNN), a convolutional deep neural network (CNN), a recurrent Boltzmann machine (RNN), a restricted Boltzmann machine (RBM), a deep belief network (DBN), a deep Q-network, and the like.

The memory 300 may store an algorithm for operation of the processor 200 and an AI processor. The memory 300 may include a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like.

Hereinafter, a method of guiding a flight route of an air mobility according to an embodiment of the present disclosure will be described in more detail below.

Figure 3:
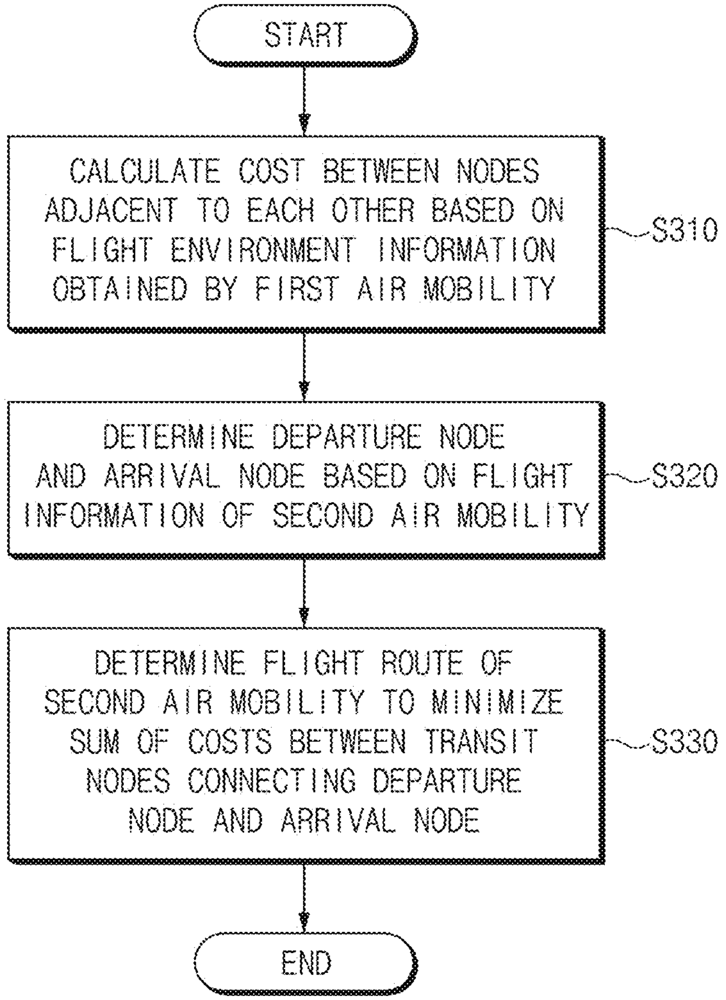
FIG. 3 is a flowchart illustrating a method of guiding a flight route of an air mobility according to an embodiment of the present disclosure.

FIG. 3 is a flowchart illustrating a method of guiding a flight route of an air mobility according to an embodiment of the present disclosure. FIG. 3 illustrates a procedure that may be performed by the server shown in FIGS. 1 and 2, and more specifically, be controlled based on the server's processor.

With reference to FIG. 3, a method of guiding a flight route of an air mobility according to an embodiment of the present disclosure will be described below.

In operation S310, the server SV may calculate costs between nodes set in the airspace based on the flight environment information obtained by the first air mobility AM1. A scheme of calculating costs between nodes set in the airspace will be described with reference to FIG. 4 below.

Figure 4:
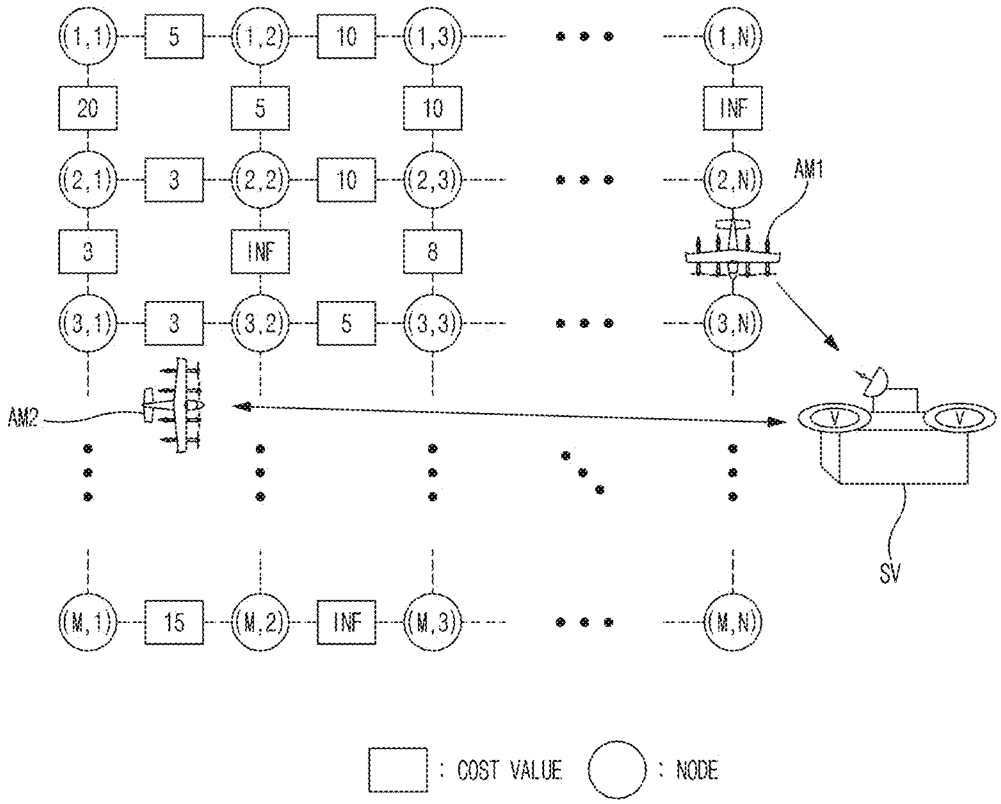
FIG. 4 is a diagram illustrating a scheme of calculating costs between nodes.

FIG. 4 is a diagram illustrating a scheme of calculating costs between nodes.

Referring to FIG. 4, the server SV may calculate the cost between nodes adjacent to each other in the airspace.

The nodes may be virtual points corresponding to preset locations, and location coordinates may be matched to each node. The location coordinates of a node may include three-dimensional information in the world coordinate system. Alternatively, the location coordinates of a node may be top-view location coordinates for airspace of a certain height and may be location coordinates defined by latitude and longitude. FIG. 4 illustrates nodes which are formed of m (m is a natural number) rows and n (n is a natural number) columns and each of which is matched to location information expressed in coordinates. The shape in which nodes are arranged may not be constant. In addition, the interval between nodes may be set arbitrarily and may not be constant. Hereinafter, node (i, j) (i is a natural number less than or equal to m and j is a natural number less than or equal to n) may refer to a node whose location coordinates match with (i, j). The location coordinates of nodes are not limited to the embodiment shown in FIG. 4, and they may be expressed as 2-dimensional location coordinates or 3-dimensional location coordinates in other manners.

The server SV may calculate the cost for the flight route based on flight environment information between nodes provided from the first air mobility AM1. For example, the first air mobility AM1 may obtain flight environment information obtained while flying to a source node of (2, N) and a neighboring node of (3, N) and transmit the obtained flight environment information to the server SV. The processor 200 of the server SV may obtain the cost between the source node and the neighboring node based on the flight environment information obtained between the source node and the neighboring node.

The cost may be calculated to increase proportionally to the expected flight time. That is, the cost may be calculated based on the distance between the source node and the neighboring node and the airspeed of the second air mobility AM2. In addition, the server SV may apply the flight environment information obtained by the first air mobility AM1 in the process of calculating the cost. The flight environment information may include wind direction information and wind speed information.

In addition, the server SV may calculate the cost by applying a weight that decreases over time. The weight may be determined to be 0 (zero) after a threshold time has elapsed.

In addition, the server SV may apply the flight information of the second air mobility AM2 in the process of calculating the cost. In other words, the cost may be updated based on the flight information obtained by the second air mobility AM2.

The flight information of the second air mobility AM2 may include performance information and auxiliary navigation device information of the second air mobility AM2.

In an embodiment of calculating the cost by applying the flight information of the second air mobility AM2, the processor 200 may calculate the cost based on the aircraft performance including the performance information of the second air mobility AM2. For example, when the processor 200 adjusts the speed vector of the second air mobility AM2 within the performance range of the second air mobility AM2, the processor 200 may determine whether it is possible to set the ground speed vector determined according to the flight of the second air mobility AM2 to be the same as the distance vector.

The ground speed according to the flight of the second air mobility AM2 may be expressed as the sum of the airspeed vector of the second air mobility AM2 and the wind speed vector. When the second air mobility AM2 flies from the source node to the neighboring node, the direction of the ground speed must be in the same direction as the distance vector from the source node to the neighboring node. Because the wind speed is uncontrollable, the ground speed may be determined by the airspeed vector of the second air mobility AM2, and the airspeed vector of the second air mobility AM2 may be determined by the performance of the second air mobility AM2. When the performance of the second air mobility AM2 is insufficient and the speed of the second air mobility AM2 is not maintained in the same direction as the ground speed vector, the cost between the source node and the neighboring node may be set to be infinite.

In addition, in another embodiment of calculating the cost by applying the flight information of the second air mobility AM2, the server SV may determine whether the auxiliary navigation device of the second air mobility AM2 may be available according to the dilution of precision (DOP) between the source node and the neighboring node.

The server SV may determine an area where the DOP between the source node and the neighboring node is greater than a preset threshold value as a GNSS unavailable area. That is, the GNSS unavailable area may be an area where it is determined that accurate location confirmation is difficult based on GNSS.

The DOP may be a quantification of the error according to the relative geometric location of the satellites used in the GNSS system. In the process of measuring a location based on the GNSS system, errors may occur depending on the placement of satellites. As the satellites are evenly spaced around the receiver and the distance between the satellites is greater, the error may be smaller. In other words, the DOP may be a numerical value indicating that the smaller the size, the more accurate the location measurement.

Schemes of expressing DOP may be classified into horizontal DOP (HDOP), vertical DOP (VDOP), position DOP (PDOP), geometric DOP (GDOP), and the like.

The server SV may determine whether the second air mobility AM2 has an auxiliary navigation device that determines location information in the GNSS unavailable area. When the second air mobility AM2 does not have an auxiliary navigation device, the processor 200 may set the cost of the GNSS unavailable area to be infinite.

FIG. 4 is a diagram illustrating an example of setting a cost between node (1, N) and node (2, N), a cost between node (2, 2) and node (3, 2), and a cost between node (M, 2) and node (M, 3) to be infinite.

In operation S320, the server SV may determine the departure node and the arrival node of the second air mobility AM2 based on the flight information of the second air mobility AM2 scheduled to fly in the airspace for which the cost is calculated.

The flight information of the second air mobility AM2 may include a departure point and a destination.

Based on the departure point of the second air mobility AM2, the server SV may determine the node closest to the departure point as the departure node. Alternatively, the server SV may determine an arbitrary node among nodes located at a certain distance from the departure point as the departure node. The server SV may determine the node closest to the destination as the arrival node based on the destination of the second air mobility AM2. Alternatively, the server SV may determine an arbitrary node among nodes located at a specified distance from the destination as the arrival node.

In operation S330, the server SV may determine the flight route of the second air mobility AM2 such that the sum of the costs between transit nodes connecting the departure node and the arrival node is minimized.

In FIG. 4, when the departure node is node (3, 1) and the arrival node is node (3, N), there may be multiple flight routes connecting the departure node and the arrival node. Each flight route may pass through different nodes, and the sum of the costs on the flight routes may be different.

The server SV may determine the flight route such that the sum of the costs is minimized, thereby reducing the flight time of the second air mobility AM2.

Hereinafter, a more specific example of a method of guiding a flight route of an air mobility according to an embodiment of the present disclosure will be described.

Figure 5:
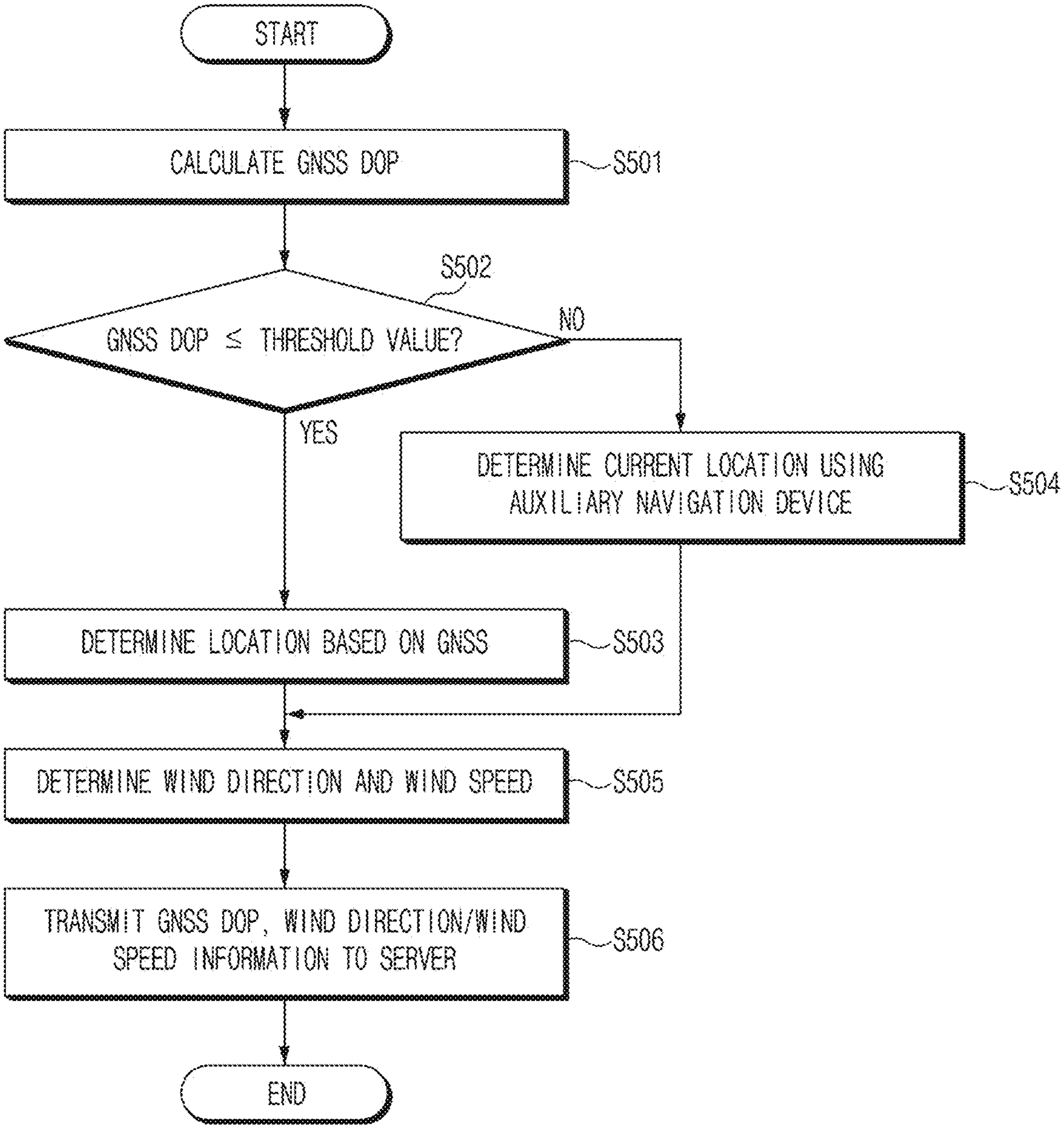
FIG. 5 is a flowchart illustrating a method of obtaining flight environment information.

FIG. 5 is a flowchart illustrating a method of obtaining flight environment information. FIG. 5 illustrates an embodiment in which the first air mobility obtains flight environment information and transmits the flight environment information to the server.

Referring to FIG. 5, in operation S501, the first air mobility AM1 may calculate the GNSS DOP.

In operation S502, the first air mobility AM1 may determine whether the GNSS DOP is less than or equal to a threshold value. The threshold value may be used to evaluate the reliability of whether the location of the first air mobility AM1 may be determined based on the GNSS system. A state in which the GNSS DOP is less than or equal to the threshold value may mean that the location may be accurately determined using GNSS.

In operation S503, when the GNSS DOP is less than or equal to the threshold value, the first air mobility AM1 may determine the in-flight location using GNSS.

In operation S504, when it is determined that the DNSS DOP is greater than the threshold value, the first air mobility AM1 may determine the location in flight by using the auxiliary navigation device.

In operation S505, the first air mobility AM1 may obtain wind direction information and wind speed information.

In operation S506, the first air mobility AM1 may transmit the GNSS DOP, the wind direction information, and the wind speed information to the server SV.

Figure 6:
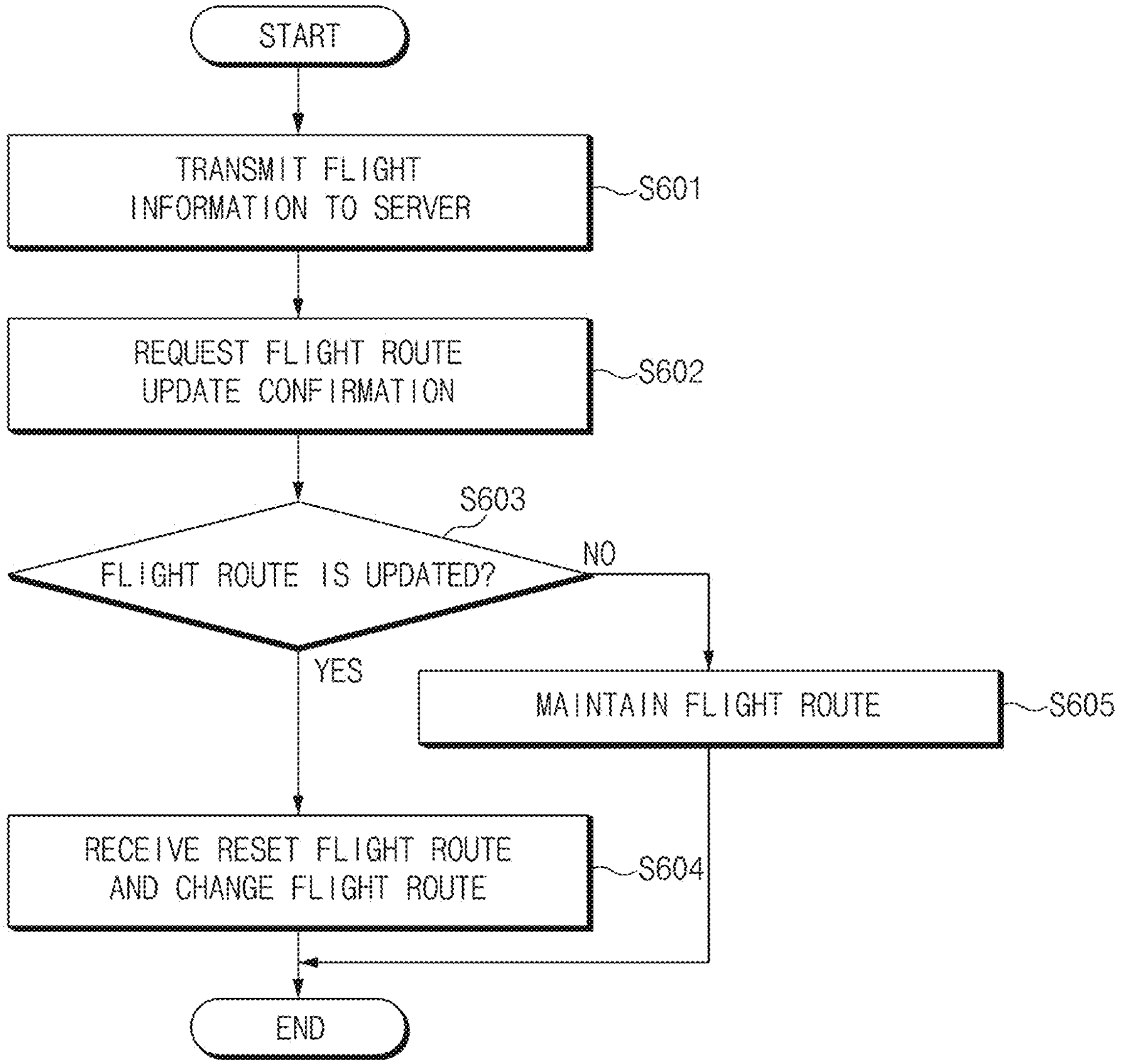
FIG. 6 is a flowchart illustrating the procedure for receiving a flight route.

FIG. 6 is a flowchart illustrating the procedure for receiving a flight route. FIG. 6 illustrates the operation of the second air mobility.

Referring to FIG. 6, in operation S601, the second air mobility AM2 may transmit flight information to the server SV. The flight information may include the departure point and the destination of the second air mobility AM2 and may be transmitted to the server SV before the second air mobility AM2 takes off. The second air mobility AM2 may receive a flight route based on the departure point and the destination and fly along the flight route.

In addition, the second air mobility AM2 may transmit the flight information to the server SV even during flight. For example, the flight information may further include performance information. The performance information transmitted by the second air mobility AM2 to the server SV may include the maximum airspeed of the second air mobility AM2.

In operation S602, the second air mobility AM2 may request flight route update confirmation from the server SV.

The flight route update may be performed based on the update of the cost. For example, the cost between nodes may be updated based on the flight environment information obtained by the first air mobility AM1 in real time. In addition, the cost between nodes may be updated based on the flight information transmitted by the second air mobility AM2. That is, the second air mobility AM2 may determine whether the cost is updated in real time even during flight.

In operations S603 and S604, when the updated flight route is received from the server, the second air mobility AM2 may fly along the reset flight route.

In operation S605, when the flight route update is not performed, the second air mobility AM2 may maintain the flight route during flight.

Figure 7:
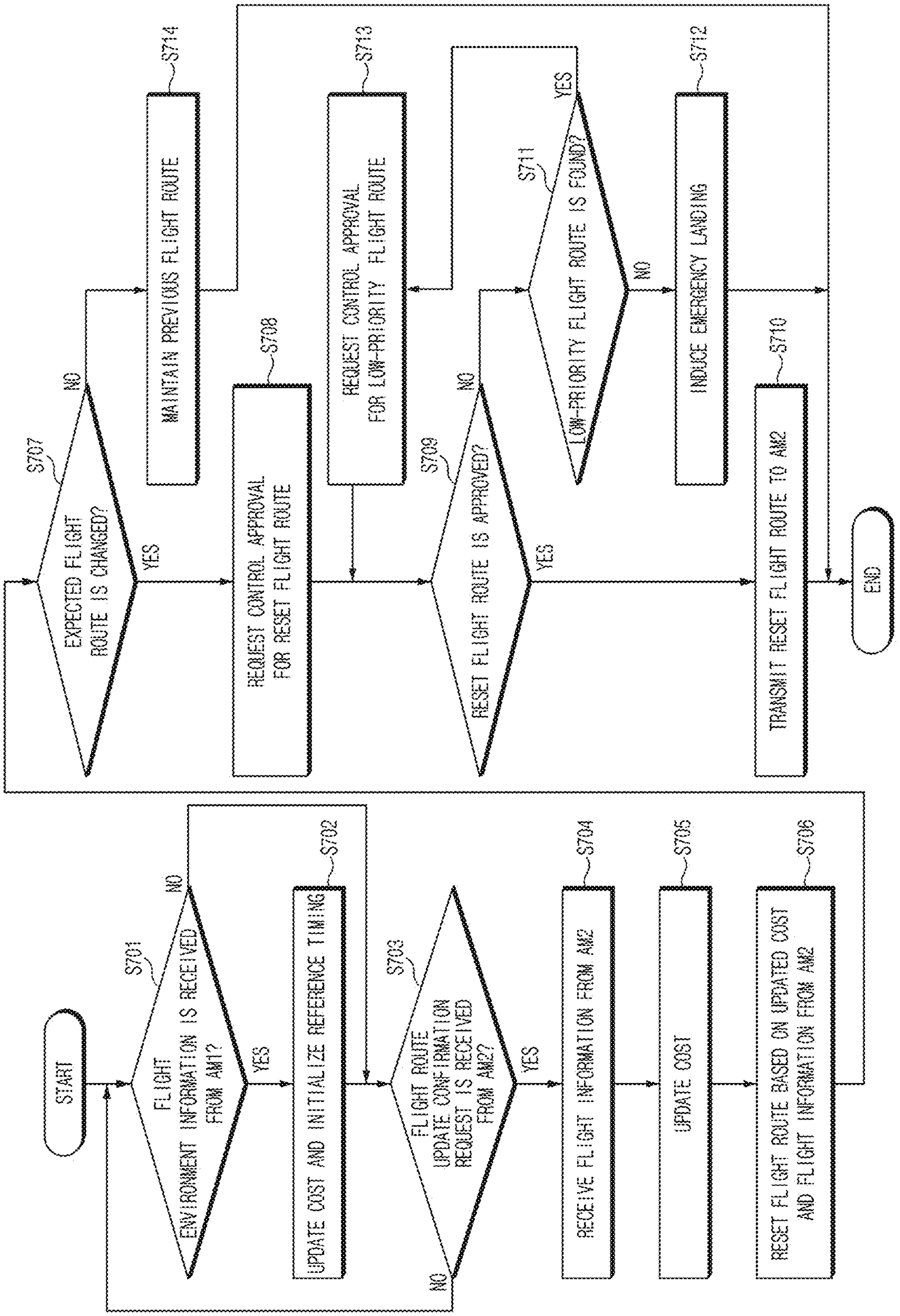
FIG. 7 is a flowchart illustrating a method of guiding a flight route according to another embodiment of the present disclosure.

FIG. 7 is a flowchart illustrating a method of guiding a flight route according to another embodiment of the present disclosure. FIG. 7 illustrates procedures performed by a processor of a server. With reference to FIG. 7, the operation of the server for guiding a flight route will be described below.

In operation S701, the server SV may receive the flight environment information from the first air mobility AM1.

In operation S702, in response to the reception of the flight environment information from the first air mobility AM1, the server SV may update the cost and initialize the reference timing.

The reference timing may be provided for determining the size of the weight. The weight may be set to decrease over time and may be intended to apply the fact that the influence of flight environment information obtained by the first air mobility AM1 is diluted over time.

In operation S703, the server SV may monitor whether a flight route update confirmation request is received from the second air mobility AM2.

In operation S704, in response to a flight route update confirmation request from the second air mobility AM2, the server SV may receive the flight information from the second air mobility AM2. Operations S703 and S704 may be performed simultaneously.

In operation S705, the server SV may update the cost based on the flight environment information provided from the first air mobility AM1 and the flight information provided from the second air mobility AM2.

In operation S706, the server SV may reset the flight route of the second air mobility AM2 based on the updated cost. Because operation S705 may be performed in real time, operation S706 may include an operation of resetting the initially set flight route.

In operation S707, the server SV may determine whether the flight route is changed. That is, the server SV may determine whether the flight route reset in operation S706 is changed from the existing flight route.

In operation S708, when the flight route is changed, the server SV may request control approval for the reset flight route.

In operations S709 and S710, when there is approval for the reset flight route, the server SV may transmit the reset flight route to the second air mobility AM2.

In operation S711, when there is no approval for the reset flight route, the server SV may search whether there is a low-priority flight route. The low-priority flight route may be a flight route other than the flight route set in operation S706.

In operation S712, when there is no low-priority flight route, the server SV may induce the emergency landing of the second air mobility AM2.

In operation S713, when a low-priority flight route exists, the server SV may request control approval for the low-priority flight route. After operation S713, the server SV may perform operation S709.

When it is determined in operation S707 that the flight route is not changed, the server SV may guide the second air mobility AM2 to maintain the flight route in operation S714.

Figure 8:
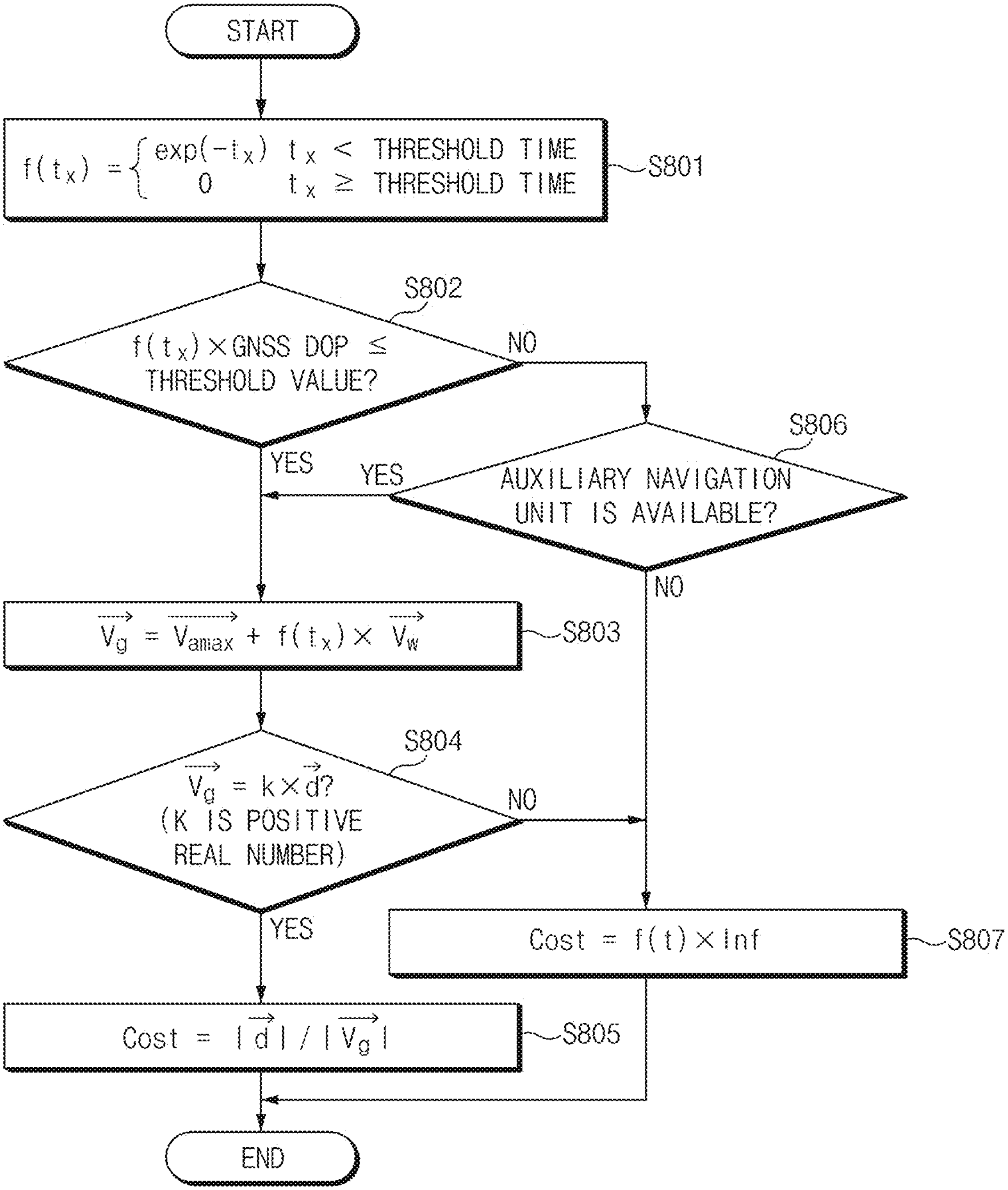
FIG. 8 is a flowchart illustrating a method of setting a cost according to an embodiment of the present disclosure.
Figure 9:
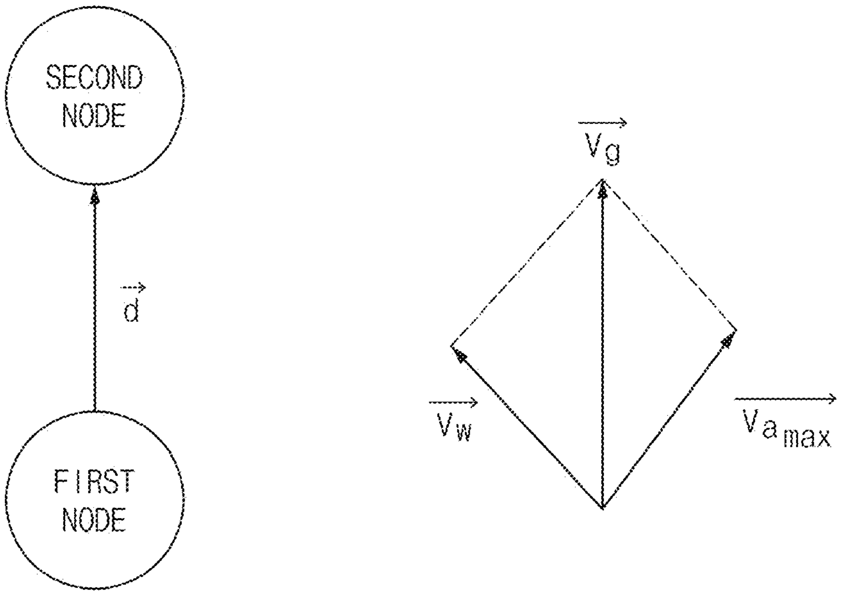
FIGS. 9 and 10 are diagrams illustrating a distance vector and a ground speed vector.
Figure 10:
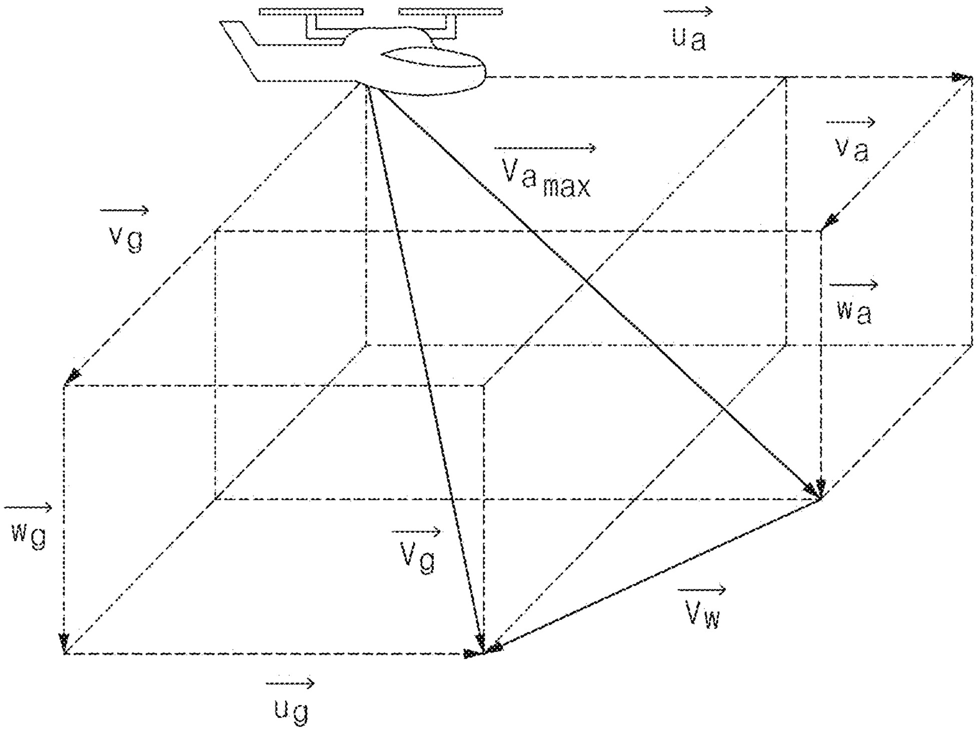

FIG. 8 is a flowchart illustrating a method of setting a cost according to an embodiment of the present disclosure. FIGS. 9 and 10 are diagrams illustrating a distance vector and a ground speed vector. FIG. 8 may illustrate procedures performed by the processor of a server. With reference to FIGS. 8 to 10, a method for setting a cost according to an embodiment of the present disclosure will be described below.

In operation S801, the server SV may determine a weight. The weight may be a function value whose size decreases over time and may be expressed as f(tx). The tx may mean the elapsed time from the reference timing and may be the time interval from the reference timing to the timing of performing operation S801. The reference timing may be the timing at which the cost update is performed. That is, the reference timing may be reset to 0 (zero) when the cost is updated. In the embodiment shown in FIG. 8, the reference timing may be the timing at which the cost is updated based on the flight environment information obtained by the first air mobility AM1.

According to an embodiment, the weight may be a function value whose size exponentially decreases over time. The function that determines the weight may not be limited to the above.

In addition, when the time is greater than a threshold time, the size of the weight may be set to 0 (zero). The server SV may set the weight to 0 (zero) after the threshold time to exclude the influence of flight environment information by the first air mobility AM1.

In operation S802, the server SV may compare the size of the DOP to which the weight is applied with the threshold. The f(tx)×DOP may mean a DOP to which a weight is applied and may mean the DOP predicted after a specified period of time from the DOP information obtained by the first air mobility AM1.

In operation S803, the server SV may calculate the ground speed vector. The ground speed vector may be calculated through following Equation 1.

$$\overrightarrow{V_g} = \overrightarrow{V_{a_{max}}} + f(t_x)\overrightarrow{V_w} \quad \text{Equation 1}$$

In Equation 1, $\overrightarrow{V_g}$ may mean the ground speed vector, $\overrightarrow{V_{a_{max}}}$ may mean the airspeed vector of the air mobility, and $\overrightarrow{V_w}$ may mean the wind speed vector. The ground speed vector may mean the ground speed as the air mobility flies. Because it is assumed in operation S803 that the second air mobility AM2, which does not reach a source node, flies from the source node to a neighboring node, Equation 1 may represent the ground speed due to the flight of the second air mobility AM2. The $f(t_x)\overrightarrow{V_w}$ may mean the wind speed vector to which the weight is applied and may be expressed as the product of the weight and the wind speed vector.

As shown in FIG. 9, the ground speed vector may be expressed as the sum of the wind speed vector and the airspeed vector of the air mobility. In addition, as shown in FIG. 10, the flight speed of the second air mobility may be expressed as the sum of three-dimensional coordinate components ($u_a$ $v_a$ $w_a$). Likewise, the ground speed may be expressed as the sum of three-dimensional coordinate components ($u_g$ $v_g$ $w_g$).

According to an embodiment of the present disclosure, as in Equation 1, the ground speed vector may be calculated as the sum of the airspeed vector of the second air mobility AM2 and the wind speed vector to which the weight is applied. In other words, the server SV may apply the weight to the wind speed vector in the process of calculating the ground speed vector according to the flight of the second air mobility AM2, so that it is possible to apply the degree to which the wind direction information and wind speed information obtained at the reference timing are diluted over time.

In operation S804, based on the performance information of the second air mobility AM2, the server SV may determine whether to set the airspeed of the second air mobility AM2 so that the ground speed vector according to the flight of the second air mobility AM2 is in the same direction as the distance vector.

As shown in FIG. 9, the distance vector may mean a vector from a first node corresponding to the source node to a second node corresponding to the neighboring node.

When the ground speed vector and the distance vector are in the same direction, the ground speed vector may be expressed as k (k is a positive real number) times the distance vector. Therefore, when the ground speed vector is k times the distance vector, the server SV may determine that the direction of the ground speed vector and the direction of the distance vector are the same.

Because the direction of the wind speed vector may not be artificially adjusted, in order to match the ground speed vector with the distance vector, the server SV may determine the control range of the airspeed vector of the second air mobility AM2. To this end, the server SV may extract performance information from the flight information received from the second air mobility AM2.

In operation S805, based on the determination that the airspeed of the second air mobility AM2 may be set so that the ground speed vector according to the flight of the second air mobility AM2 is in the same direction as the distance vector, the server SV may calculate the cost between the source node and the neighboring node.

The cost may be determined to be proportional to the size of the distance vector and inversely proportional to the size of the ground speed vector.

In addition, when the DOP to which the weight is applied is greater than the threshold value in operation S802, in operation S806, the server SV may determine whether the second air mobility AM2 may use an auxiliary navigation device.

When the second air mobility AM2 may use an auxiliary navigation device, the server SV may perform operation S803 because the location may be determined even in a GNSS unavailable area.

When the second air mobility AM2 cannot use an auxiliary navigation device, the server SV may guide the route so that the second air mobility AM2 does not enter the GNSS unavailable area. To this end, when it is determined in S806 that the second air mobility AM2 cannot use the auxiliary navigation device, the server SV may go to operation S807.

In operation S807, the server SV may set the cost to be infinite.

The route between the source node and the neighboring node whose cost is set to be infinite may be excluded in the process of selecting a flight route. Therefore, when the second air mobility AM2 cannot use an auxiliary navigation device in a GNSS unavailable area, the route between the source node and the neighboring node corresponding to the GNSS unavailable area may be excluded from the flight route.

In addition, when it is determined in operation S804 that the airspeed of the second air mobility AM2 cannot be set so that the ground speed vector is in the same direction as the distance vector, the server SV may go to operation S807. For example, when it is determined that the second air mobility AM2 cannot fly from the source node to the neighboring node because the performance of the second air mobility AM2 is not at a level to exclude the influence of the wind, the server SV may set the cost between the first node and the second node to be infinite. Accordingly, the route between the first node and the second node may be excluded from the flight route of the second air mobility AM2.

Figure 11:
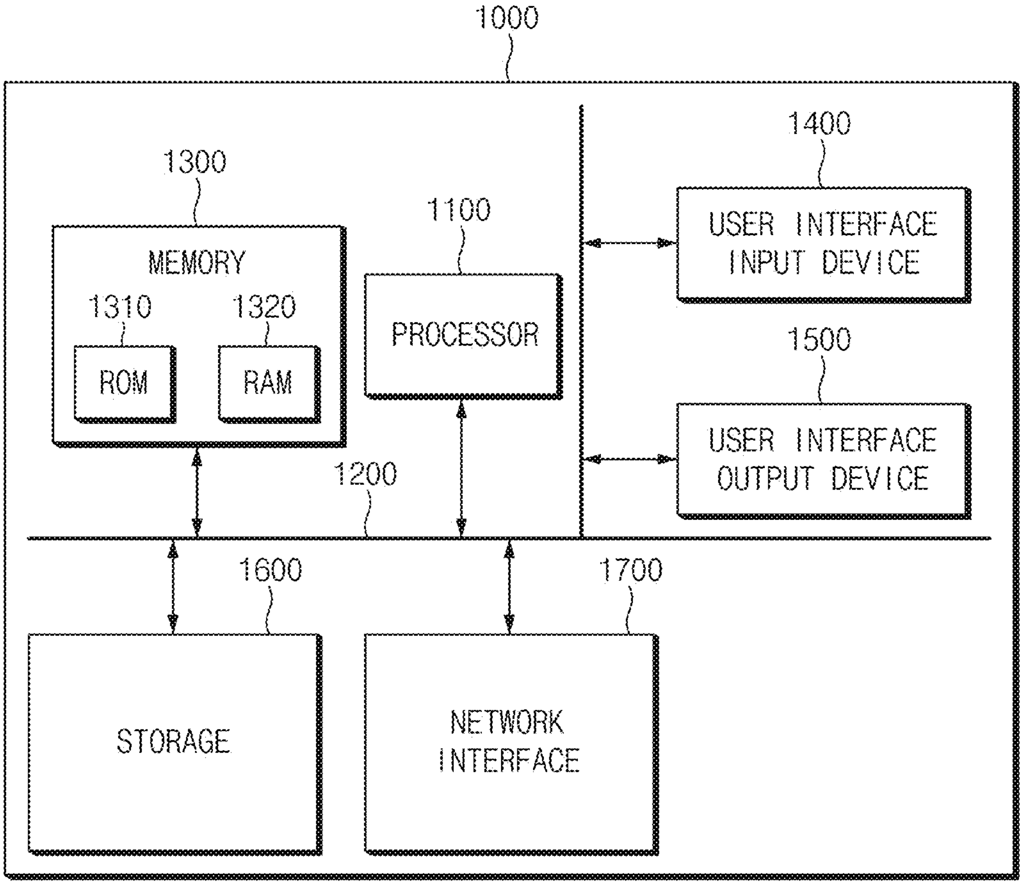
FIG. 11 is a block diagram illustrating a computing system according to an embodiment of the present disclosure.

FIG. 11 is a block diagram illustrating a computing system according to an embodiment of the present disclosure.

Referring to FIG. 11, a computing system 1000 may include at least one processor 1100, a memory 1300, a user interface input device 1400, a user interface output device 1500, a storage (i.e., a memory) 1600, and a network interface 1700 connected through a bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, a solid state drive (SSD), a detachable disk, or a CD-ROM.

The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the flight route of the following second air mobility may be guided based on the flight environment information obtained by the preceding first air mobility to respond more flexibly to weather conditions and flight environments that change in real time, so that it is possible to guide the flight route of the second air mobility.

In addition, according to the embodiments of the present disclosure, a weight that varies over time may be applied to the flight environment information obtained by the first air mobility, so that the flight environment information corresponding to the flight time of the second air mobility is more accurately applied to guide the flight route.

In addition, according to the embodiments of the present disclosure, the flight route may be set to minimize the flight time of the second flight mobility, so that the second flight mobility may quickly arrive at the destination.

In addition, various effects that are directly or indirectly understood through the present disclosure may be provided.

Although exemplary embodiments of the present disclosure have been described for illustrative purposes, those skilled in the art will appreciate that various modifications, additions, and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for guiding a flight route of an air mobility, the apparatus comprising:

a communication device configured to communicate with a first air mobility and a second air mobility;

one or more processors configured to guide a flight route of the second air mobility based on flight environment information obtained by the first air mobility that has previously flown in an airspace; and a non-transitory storage device storing a program to be executed by the one or more processors, the program including instructions to:

determine a cost between an arbitrary source node among a plurality of nodes set in the airspace and a neighboring node adjacent to the arbitrary source node among the plurality of nodes based on the flight environment information provided from the first air mobility through the communication device;

determine a departure node and an arrival node among the plurality of nodes based on flight information of the second air mobility scheduled to fly in the airspace for which the cost is calculated;

determine the flight route of the second air mobility to minimize a sum of the cost between transit nodes among the plurality of nodes connecting the departure node and the arrival node;

control the second air mobility to fly along the determined flight route;

extract wind direction information and wind speed information between the arbitrary source node and the neighboring node from the flight environment information;

calculate an expected flight time between the arbitrary source node and the neighboring node by reflecting the wind direction information and the wind speed information; and determine the cost to be proportional to the expected flight time.

2. The apparatus of claim 1, wherein the program further includes instructions to:

obtain a distance vector from the arbitrary source node to the neighboring node;

obtain a ground speed vector based on assuming a situation where the second air mobility flies from the arbitrary source node to the neighboring node; and calculate the cost to be proportional to a size of the distance vector and inversely proportional to a size of the ground speed vector.

3. The apparatus of claim 2, wherein the program further includes instructions to:

obtain a weight that decreases with time from a reference timing at which the first air mobility obtains the flight environment information;

obtain a wind speed vector to which the weight is applied to obtain a weighted wind speed vector; and obtain the ground speed vector by adding the weighted wind speed vector and an estimated flight speed vector of the second air mobility.

4. The apparatus of claim 3, wherein the program further includes instructions to determine the weight to be zero after a threshold time elapses from the reference timing.

5. The apparatus of claim 3, wherein the program further includes instructions to update the cost based on the flight environment information of the second air mobility.

6. The apparatus of claim 5, wherein the program further includes instructions to:

extract performance information of the second air mobility from the flight environment information;

determine whether an airspeed of the second air mobility is able to be set such that the ground speed vector according to a flight of the second air mobility is in a same direction as the distance vector based on the performance information of the second air mobility; and set the cost between the arbitrary source node and the neighboring node to infinite based on a determination that the ground speed vector is unable to be adjusted in the same direction as the distance vector.

7. The apparatus of claim 5, wherein the program further includes instructions to:

calculate a dilution of precision (DOP) for an area between the arbitrary source node and the neighboring node;

determine whether an auxiliary navigation device of the second air mobility is available in the flight environment information based on a determination that the DOP to which the weight is applied is greater than a threshold value; and set the cost between the arbitrary source node and the neighboring node to be infinite based on a determination that the auxiliary navigation device of the second air mobility is unavailable.

8. The apparatus of claim 5, wherein the program further includes instructions to reset the reference timing to zero after the cost is updated.

9. The apparatus of claim 1, wherein the program further includes instructions to:

monitor whether the cost is updated after determining the flight route of the second air mobility; and reset the flight route based on a determination that the cost is updated.

10. A method of guiding a flight route of an air mobility, the method comprising:

calculating a cost between an arbitrary source node among a plurality of nodes set in an airspace and a neighboring node adjacent to the arbitrary source node among the plurality of nodes based on flight environment information obtained by a first air mobility that has previously flown in the airspace;

determining a departure node and an arrival node among the plurality of nodes based on flight information of a second air mobility scheduled to fly in the airspace for which the cost is calculated;

determining a flight route of the second air mobility to minimize a sum of the cost between transit nodes among the plurality of nodes connecting the departure node and the arrival node; and controlling the second air mobility to fly along the determined flight route, wherein calculating the cost comprises:

extracting wind direction information and wind speed information between the arbitrary source node and the neighboring node from the flight environment information;

calculating an expected flight time between the arbitrary source node and the neighboring node by reflecting the wind direction information and the wind speed information; and determining the cost to be proportional to the expected flight time.

11. The method of claim 10, wherein calculating the cost further comprises:

obtaining a distance vector from the arbitrary source node to the neighboring node;

obtaining a ground speed vector based on assuming a situation where the second air mobility flies from the arbitrary source node to the neighboring node; and calculating the cost to be proportional to a size of the distance vector and inversely proportional to a size of the ground speed vector.

12. The method of claim 11, wherein obtaining the ground speed vector comprises:

obtaining a weight that decreases with time from a reference timing at which the first air mobility obtains the flight environment information;

obtaining a wind speed vector to which the weight is applied to obtain a weighted wind speed vector; and adding the weighted wind speed vector and an estimated flight speed vector of the second air mobility.

13. The method of claim 12, wherein obtaining the weight further comprises determining the weight to be zero after a threshold time elapses from the reference timing.

14. The method of claim 12, wherein calculating the cost further comprises updating the cost based on the flight environment information of the second air mobility.

15. The method of claim 14, wherein calculating the cost further comprises:

extracting performance information of the second air mobility from the flight environment information;

determining whether an airspeed of the second air mobility is able to be set such that the ground speed vector according to a flight of the second air mobility is in a same direction as the distance vector based on the performance information of the second air mobility; and setting the cost between the arbitrary source node and the neighboring node to infinite based on a determination that the ground speed vector is unable to be adjusted in the same direction as the distance vector.

16. The method of claim 14, wherein calculating the cost further comprises:

calculating a dilution of precision (DOP) for an area between the arbitrary source node and the neighboring node;

determining whether an auxiliary navigation device of the second air mobility is available in the flight environment information based on a determination that the DOP to which the weight is applied is greater than a threshold value; and setting the cost between the arbitrary source node and the neighboring node to be infinite based on a determination that the auxiliary navigation device of the second air mobility is unavailable.

17. The method of claim 14, wherein calculating the cost further comprises resetting the reference timing to zero after the cost is updated.

18. The method of claim 10, further comprising:

monitoring whether the cost is updated after determining the flight route of the second air mobility; and resetting the flight route based on a determination that the cost is updated.

* * * * *